United States Patent [19]

Aiyer et al.

[11] Patent Number: 5,936,254

[45] Date of Patent: Aug. 10, 1999

[54] THIN FILM DETECTION METHOD AND APPARATUS

[75] Inventors: Arun A. Aiyer, Fremont; John H. McCoy, San Carlos; Henry K. Chau, San Francisco, all of Calif.

[73] Assignee: Nikon Research Corporation of America, Belmont, Calif.

[21] Appl. No.: 08/814,398

[22] Filed: Mar. 11, 1997

[51] Int. Cl.⁶ .................................................. G01B 9/02
[52] U.S. Cl. ................................. 250/559.4; 250/559.02; 356/355
[58] Field of Search .......................... 250/559.02, 559.4, 250/559.27; 356/381, 382, 355, 357, 369

[56] References Cited

U.S. PATENT DOCUMENTS

| | | | |
|---|---|---|---|
| 5,232,547 | 8/1993 | Drowley et al. | 156/601 |
| 5,293,214 | 3/1994 | Ledger | 356/355 |
| 5,337,150 | 8/1994 | Mumola | 356/382 |
| 5,381,234 | 1/1995 | Barbee et al. | 356/369 |
| 5,729,343 | 3/1998 | Aiyer | 356/355 |

FOREIGN PATENT DOCUMENTS

| | | | |
|---|---|---|---|
| 4-35682 | 6/1992 | Japan | G01B 11/08 |
| 4-53362 | 8/1992 | Japan | G01B 11/06 |

OTHER PUBLICATIONS

D. Willenborg et al., "A novel micro–spot dielectric film thickness measurement system", SPIE vol. 1594, Process Module Metrology, Control and Clustering (1991) pp. 322–333.

*Primary Examiner*—Edward P. Westin
*Assistant Examiner*—Kevin Pyo
*Attorney, Agent, or Firm*—Skjerven, Morrill, MacPherson Franklin & Friel LLP; Norman R. Klivans

[57] ABSTRACT

A method and apparatus for detecting the presence of a thin film such as a photoresist film on a semiconductor wafer or other substrate. Only when a film is present does the surface reflectance (reflective power) of light incident on the wafer surface vary sinusoidally when the incidence angle of the light is varied. This sinusoidal variation in the reflected optical power is due to interference occurring between the film surface and wafer surface reflections. This method and apparatus allows determining whether an undeveloped photoresist layer is present on a wafer; this is not possible using merely visual inspection especially when an underlying pattern is present. The present method and apparatus may also be used to determine the thickness of a particular thin film.

16 Claims, 4 Drawing Sheets

THIN FILM DETECTION METHOD AND APPARATUS

FIELD OF THE INVENTION

This invention relates to detecting the presence of thin films, such as a thin film of photoresist, formed on a substrate, such as a silicon wafer.

BACKGROUND OF THE INVENTION

In semiconductor device fabrication, typically silicon wafers have formed on them thin films such as photoresist ("resist"). The photoresist is conventionally used for defining patterns on the surface of the wafer. For instance, the photoresist is deposited over a layer of e.g. silicon dioxide on the wafer. A pattern is then imaged in the photoresist by photolithography and the photoresist is developed, defining a pattern in the photoresist. An etchant is then applied to the structure, etching away the portions of the silicon dioxide layer which are exposed by the development of the photoresist.

The present inventors have identified the problem that it is often difficult to detect the presence or absence of such photoresist films, especially on a wafer which has already been partially patterned. It is to be understood that the semiconductor fabrication process involves a series of depositions of such photoresist layers and their development and subsequent patterning and etching to build up the semiconductor structure as a stack of layers which are each patterned individually. Since the photoresist films are very thin and often have the same visual characteristics as the underlying portion of the patterned wafer, detecting them by visual observation is often difficult or even impossible. Currently the only sure way to confirm the presence (or absence) of a photoresist film is by actually exposing the photoresist and developing it. Of course, this may be problematic in terms of yield reduction and excess processing steps. Thus this is especially problematic when photoresist is absent. There is no known prior art directed specifically toward such thin film detection, especially in the semiconductor fabrication context.

SUMMARY

In accordance with this invention, there is provided an easy to perform, rapid and nondestructive method and apparatus for detecting the presence of thin films on e.g. a semiconductor wafer or other type of substrate. In accordance with the invention, it has been found by the present inventors that only when such a thin film is present does the substrate surface reflectance (i.e. the reflective power of a light beam incident on the wafer surface) vary sinusoidally when the incidence angle of the light beam, is varied. This effect is due to interference that occurs between surface waves and substrate waves, i.e. those portions of the light wave reflected from the upper surface of the thin film versus those reflected from the underlying wafer surface. Thus advantageously this provides a system which can be used for instance in the semiconductor fabrication field to detect the presence of photoresist films, without any need for exposure or development of the photoresist and with a relatively simple apparatus. This is an improvement over other possible solutions to this problem such as ellipsometry, which requires polarization analysis of reflected light to detect the thin film. Another possible solution involving multiple wavelength reflectance requires a knowledge of the optical properties of the substrate (i.e. the wafer) in order to detect a film present thereon. While these are known thin film measurement techniques they have been implemented in the semiconductor area only for film thickness measurement and also are relatively complex.

Advantageously in accordance with this invention there is no need for multi-wavelength light or for polarization analysis. The presence of a thin film such as photoresist, oxide etc. can be determined without any particular analysis, merely by simple observation. Moreover the inspection equipment is relatively simple and does not even require any moving parts in at least one embodiment.

DETAILED DESCRIPTION

Figure 1:
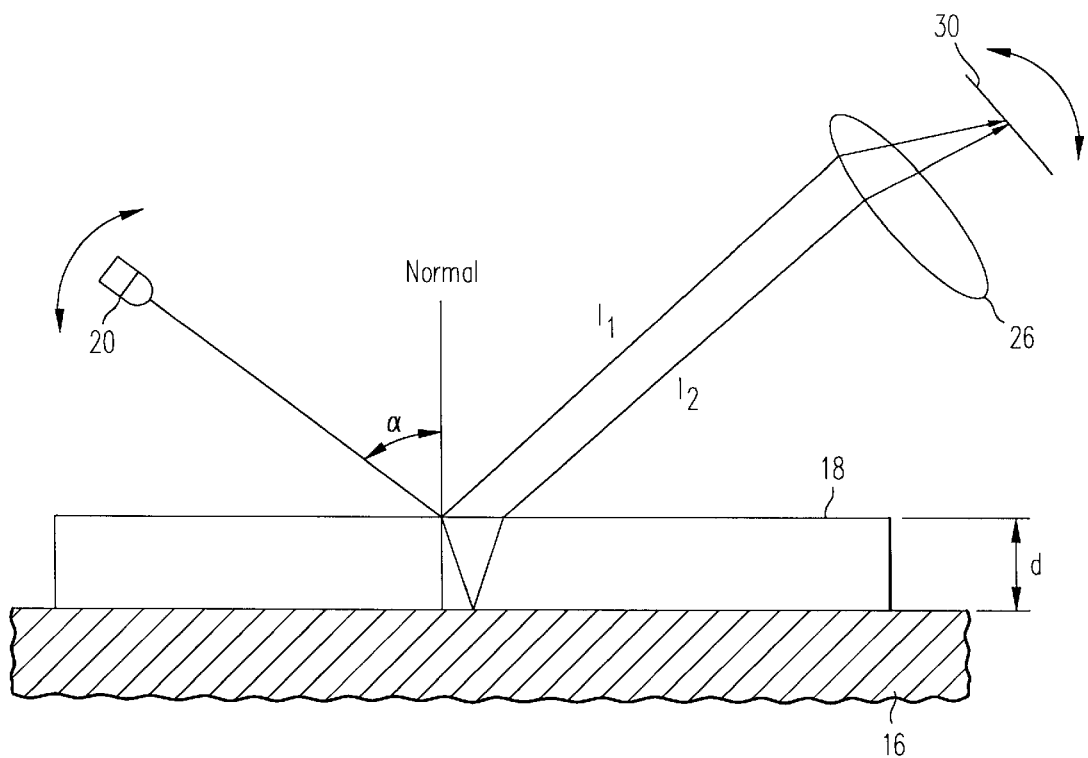
FIG. 1 illustrates a method of detecting a thin film in accordance with this invention.

FIG. 1 shows in a simplified way detection of a thin film in accordance with this invention. A conventional wafer 16 (of silicon for instance) only shown in part in side view has formed on its principal surface a photoresist film 18 having a thickness d. Film 18 is typically an undeveloped photoresist film which is difficult or impossible to detect by mere visual observation especially when there is an underlying pattern. To detect the presence of film 18 in accordance with this invention, a source of light 20 directs a beam of light incident at angle $\alpha$ upon the upper surface of the photoresist film 18. Source 20 is in one embodiment a light emitting diode (LED) emitting radiation in the visible spectrum at 565 nm wavelength (this is of course not limiting but merely illustrative since other light, e.g. infrared, can also be used). This light has angle of incidence $\alpha$ with respect to the normal line which is perpendicular to the plane of the principal surface of the photoresist film 18.

The beam of light is reflected from the principal surface of film 18 as indicated by light intensity $I_1$. A portion of the incident light from source 20 passes through the photoresist film 18, is refracted thereby, and reflects from the upper surface of the wafer (substrate) 16, passes back through the photoresist film 18 and is indicated by light intensity $I_2$. The two reflected light beams $I_1$ and $I_2$ are then focussed by a suitable optical element or elements (lenses) 26 onto a detector 30, for instance a CCD (charge coupled device) video camera or some other suitable intensity detection device sensitive to the wavelength radiation emitted from source 20. Optical element 26 collects light over a finite range of angles, to concentrate the light for more efficient detection. The actual number of detectors and the collection angle of each detector is a system design choice. An alternative is use of large area detectors.

The total intensity I of the light $I_1$ and $I_2$ reflected from the thin film is dependent on its thickness d as well as the incidence angle α and wavelength. The relationship among these is represented by the following well-known equation interference:

$$I = I_1 + I_2 + 2(I_1 I_2)^{1/2} \cos[(4\pi d/\lambda)[n^2 - \sin^2 \alpha]^{1/2}]$$

Figure 2:
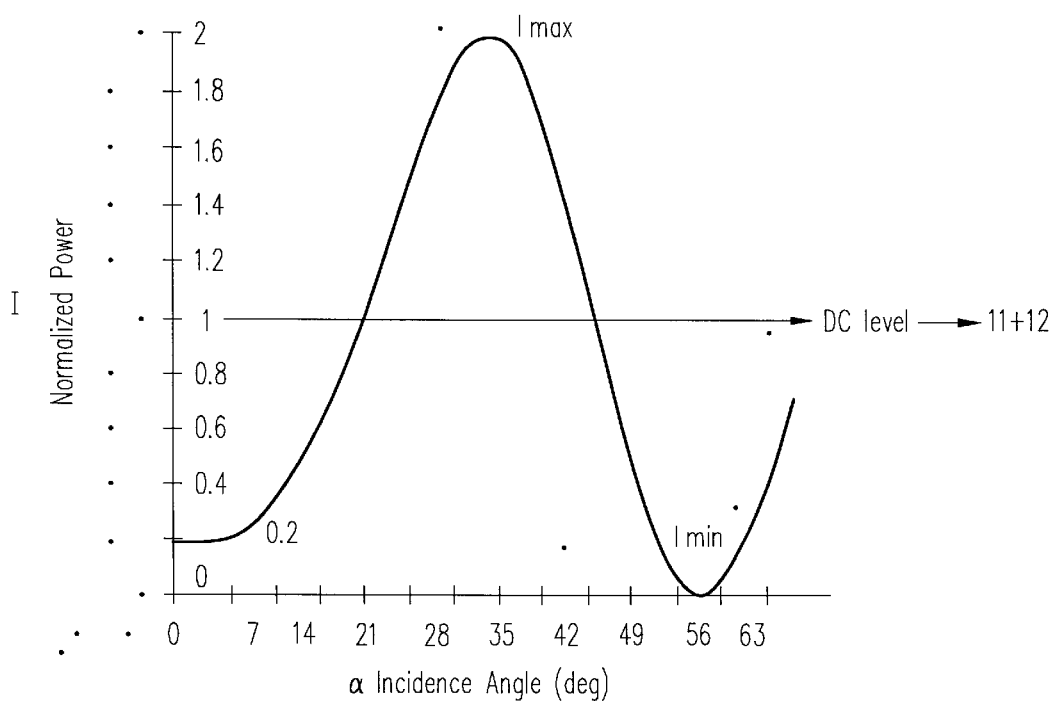
FIG. 2 illustrates in accordance with this invention how reflected power from a thin film varies sinusoidally with incidence angle of the incident light.

From this equation it is clear that the reflected power exhibits a cosine squared behavior as incidence angle α varies. FIG. 2 shows a plot of incidence angle α in degrees (horizontal axis) versus the total normalized power I as detected by detector 30. Hence the vertical axis is an arbitrary measurement and does not represent any particular units. It can be seen that for a one micrometer (mm) thick positive photoresist film 18 (shown here merely for illustration) having a refractive index of 1.65, a well defined sinusoidal pattern is present having a maximum intensity $I_{MAX}$ and a minimum intensity $I_{MIN}$. The maximum intensity is present at approximately thirty degrees and the minimum intensity at approximately fifty-six degrees. Hence a sensing method in accordance with this invention observes the position of $I_{MAX}$ or $I_{MIN}$ of the reflective power in angle space, as the incidence angle α on the wafer is varied, for instance by tilting the wafer or by using a suitably extended source.

In one embodiment this process is carried out manually by providing a fixed source 20 and a fixed detector 30 and manually tilting the wafer, or tilting the wafer on a suitable tilt support. (This tilting is suggested by the arrows adjacent to structures 20 and 30 in FIG. 1.) It is to be understood that a plot such as that of FIG. 2 can be calculated theoretically or arrived at experimentally by using film having a known thickness formed on a wafer. Then after the information as to the $I_{MAX}$ and $I_{MIN}$ angles is determined either experimentally or theoretically, one may readily test a wafer on which it is not known whether a thin film is present.

In another embodiment the angle of incidence is varied by moving the LED 20 and the detector 30 symmetrically. This could be done in a purely manual fashion if desired without use of any specially adapted apparatus, or the LED/detector motion can be motorized.

Figure 3:
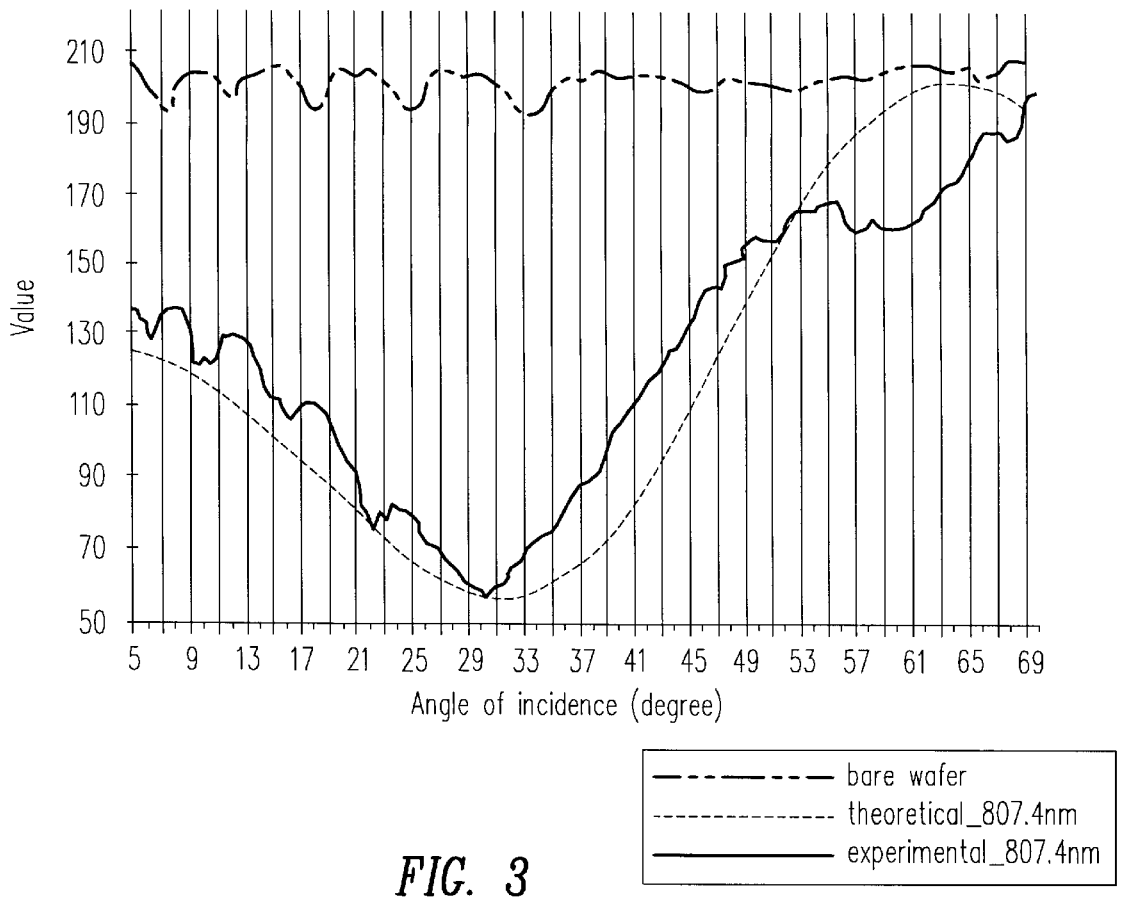
FIG. 3 shows a comparison of the sinusoidal variation in reflected power both theoretically and experimentally in accordance with this invention in the presence of a thin film and in the absence thereof.

FIG. 3 shows results of carrying out this method. The horizontal axis is angle of incidence in degrees. The vertical axis is in the light intensity value (in arbitrary intensity units) detected by detector 30 (e.g. a CCD or photosensitive diode). This is for an exemplary photoresist film thickness of 807.4 nanometers. The upper heavy dotted line, which is approximately horizontal, is the plot for a bare wafer, i.e. having no photoresist film formed thereon. As shown this does not exhibit any particular incidence angle effect, but merely some small random fluctuations. Hence this horizontal plot is a good indication of a bare wafer.

The lower lighter dotted line is the result of a theoretical calculation of the reflected light intensity versus angle of incidence for this situation. This line exhibits a definite sinusoidal pattern. The solid line is the experimental results derived by an apparatus as shown in FIG. 1 on an actual wafer having an 807.4 nanometer (average thickness) photoresist layer formed thereon. The observed light intensity closely follows the theoretical one and exhibits a sharply defined minimum corresponding almost exactly to the theoretically determined minimum. Also shown is a maximum which is close to the theoretically determined maximum.

Figure 4:
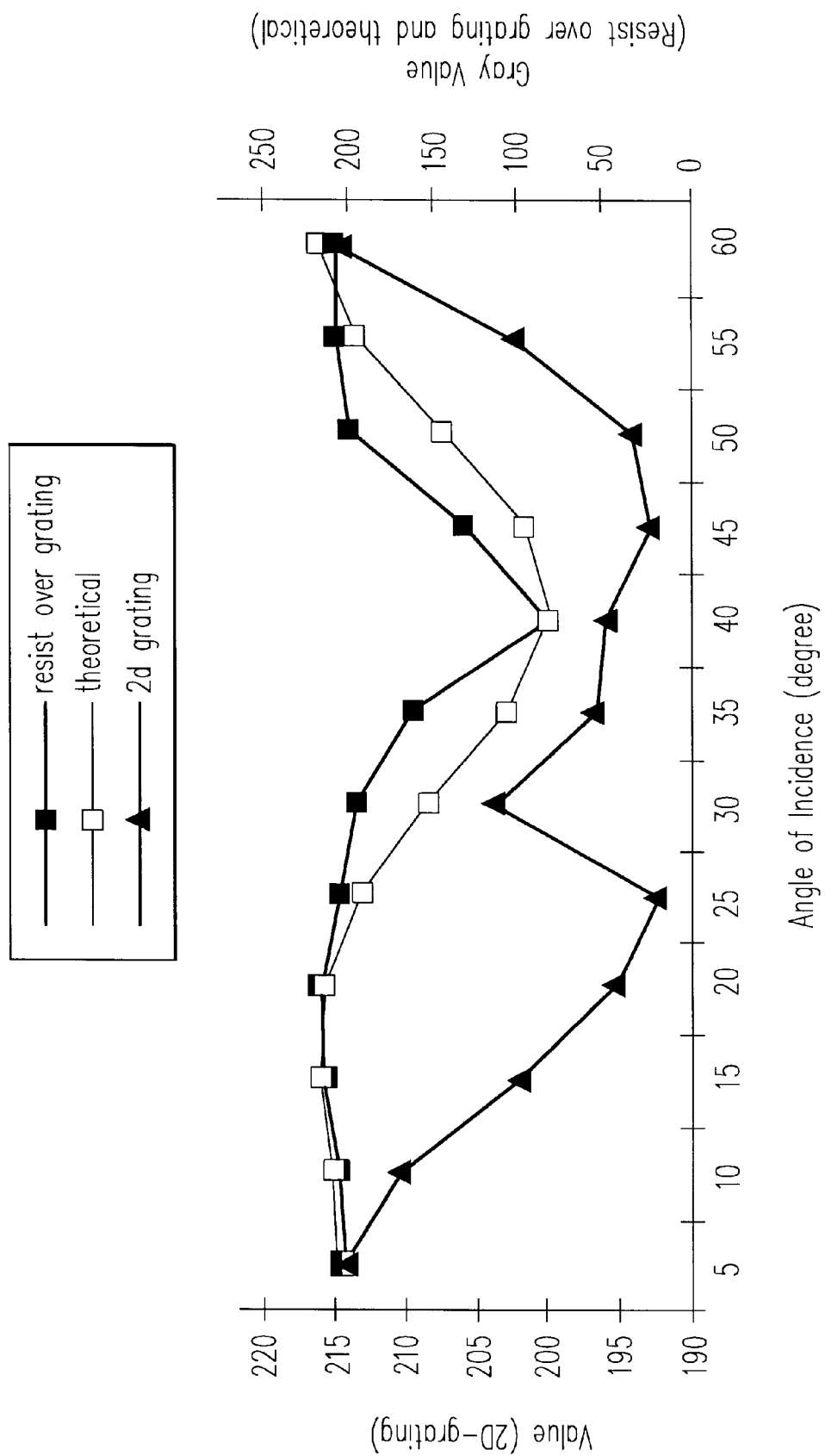
FIG. 4 shows a plot of reflective power from a semiconductor wafer with a two-dimensional pattern formed thereon and the same wafer with a photoresist layer formed over the two-dimensional pattern.

FIG. 4 shows a somewhat similar plot. Here the wafer has a pattern formed on its surface and a photoresist film formed thereover. The pattern is called a "grating" since it has the effects of a diffraction grating. The lower plot (designated by the triangles) is for a wafer having such a pattern formed on it but no overlying photoresist film. This shows some unusual angular dependent behavior; however it is not a regular sinusoidal pattern. The hollow squares designate a theoretical plot for such a wafer having a grating formed on it and an overlying photoresist film, exhibiting a sinusoidal curve similar to that of FIG. 3. The solid squares designate a plot showing experimental results for a wafer having a two-dimensional grating formed on it and an overlying photoresist film. As shown, this approximates the theoretically defined curve. Hence even in this situation the present method is applicable to detect the presence of a photoresist film. That is to say, the cosine squared behavior described above is present in the wafer coated with the photoresist film and not in the uncoated wafer even when bearing a pattern. Thus even for patterned wafer, one can effectively detect the presence or absence of a photoresist film in accordance with this invention.

Figure 5:
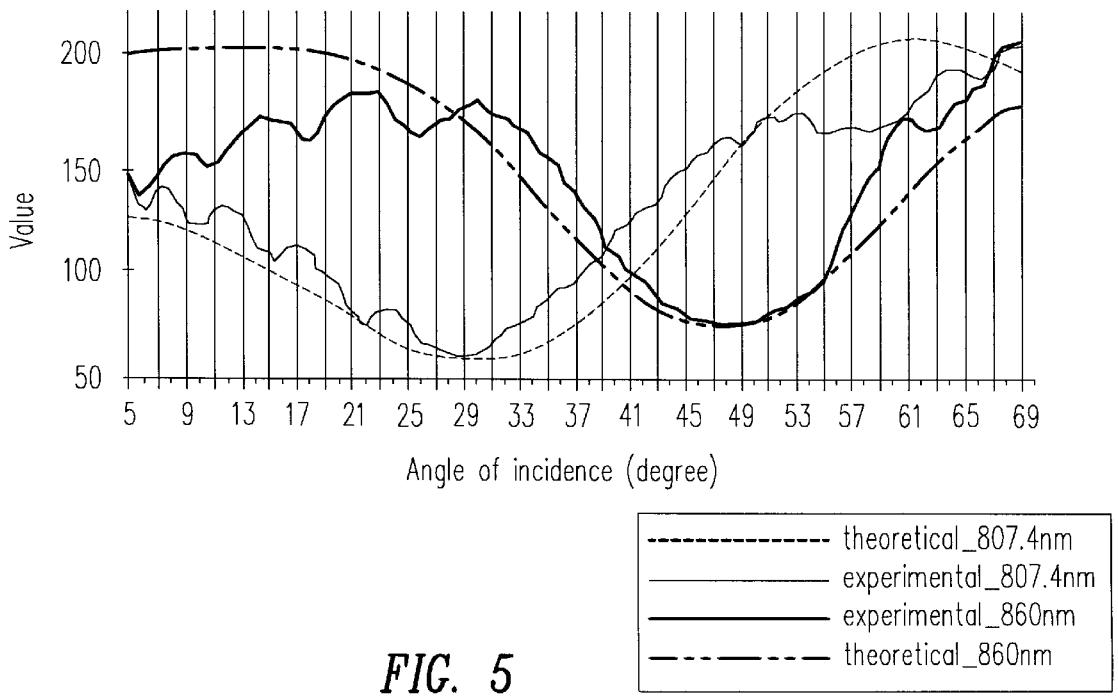
FIG. 5 shows in accordance with the invention a plot of optical power versus angle of incidence of the incident light for two different thicknesses of thin films formed on a substrate, both experimentally and theoretically.

FIG. 5 is a graph similar to that of FIG. 3 and shows how it is possible in accordance with this invention to determine the actual photoresist film thickness, as well as its presence or absence. The legend shown in the right hand portion is for two thicknesses of photoresist, one 807.4 nanometers and the second which is slightly thicker, 860 nanometers. The theoretical plots for these two film thicknesses are substantially different. Hence theoretically it is possible to determine a film thickness from such an observation. The illustrated experimental plots closely track the theoretical plots. Thus as expected from the theoretical considerations, the experimental plots are shifted in angular space relative to one another for the two different photoresist film thicknesses. This allows one to determine the actual thickness of a photoresist film, which is often useful in photolithography applications. The following equation provides the sensitivity of this measurement of the thickness d:

$$\Delta d = [2d^3/[(m \pm 0.5)^2 \lambda^2)](\sin 2\alpha) \cdot \Delta \alpha$$

In this equation m is the fringe order of the interference fringe, and α is the incidence angle at which $I_{MIN}$ occurs for thickness d. A shift in α by $\Delta \alpha = \pm 2°$ represents a thickness change of Δd approximately ±4 nanometers from the expected thickness value.

Hence not only is the present method useful to detect presence or absence of a photoresist layer, it is also useful to accurately determine the thickness of a particular photoresist film. This can be used to calibrate the photoresist depositing equipment.

Figure 6:
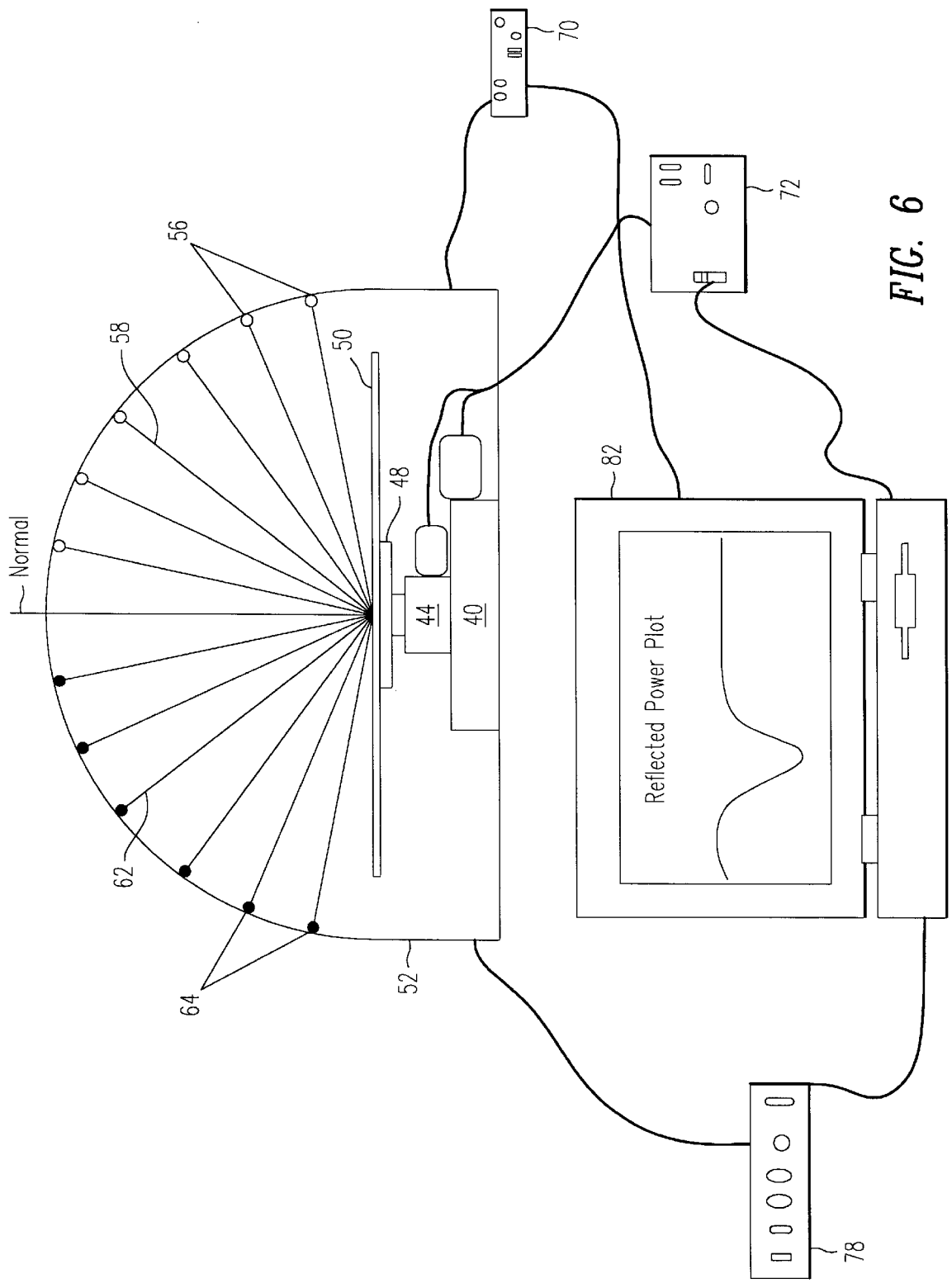
FIG. 6 shows an apparatus for detecting the presence of thin films on a wafer in accordance with this invention.

FIG. 6 shows a thin film detector apparatus in accordance with this invention. This is a schematic depiction of this device; each depicted component is conventional. Moreover this is only an exemplary apparatus and other apparatuses for carrying out a method in accordance with the invention may be constructed. In this apparatus a linear movement stage 40 supports a rotary stage 44. The linear stage 40 is capable of XY direction movement and the rotary stage 44 allows rotation in a plane orthogonal to that of the figure.

Rotary stage 44 supports a substrate holder 48, e.g. a vacuum chuck. Substrate 50 sits on holder 48. It is to be appreciated that this apparatus is not limited to use with semiconductor wafers but may be adapted for any sort of substrate on which a thin film is present on the upper surface of substrate 50. This entire device is housed within an enclosure 52. In some embodiments the enclosure 52 interior is kept under controlled temperature and cleanliness conditions to prevent substrate contamination. In other cases the entire apparatus is housed within a "clean room" and no such precautions are necessary. The main function of enclosure 52 is to support a plurality of light sources and detectors, for instance the sources are light emitting diodes 56, which are located spaced apart along the arc of the interior surface of enclosure 52. Enclosure 52 may be of any suitable size dependent on the size of the substrate 50. The only requirement for enclosure 52 (if it has no environmental functions) is that it support the light sources 56 and the light sensors 64. Of course if the enclosure 52 is also providing any sort of environmental protection, it must also meet pertinent requirements.

The light sources 56 each emit a light ray 58 (only one of which is labeled). The light rays 58 are incident upon substrate 50 and reflect therefrom shown as light beams 62 (again only one of which is labeled). These light beams are detected by suitably located sensor devices 64. Each of these may be for instance a CCD or other suitable device sensitive to the particular light wavelength used. The actual number and arrangement of the light sources and sensors is a design choice dictated by the thickness of the films to be detected, the substrate size, the optical properties of such films, and the light wavelength. It is of course desirable as shown by FIG. 1 that one be able to detect light which is incident over a range of angles of incidence so as to detect the needed local minima and/or maxima. One need not be able to detect both a minimum or maximum; to the extent one does, this provides a more definite indication of thin film presence and/or thickness. The other elements shown in FIG. 6 include an LED power supply and control 70 which is conventional, and a motor controller 72 for controlling both the linear stage 40 and the rotary stage 44.

A sensor control and signal acquisition circuit 78 is provided which is connected to each of the sensors 64; this is not shown in detail. The output signal from sensor control and signal acquisition circuit 78 is coupled to for instance a signal processor (e.g. computer) 82 which in this case provides an actual display showing a reflected power plot. Of course other display or indicator techniques may be used, such as a meter or printed indication.

A computer is not needed; the required signal processing and determination of the reflected light maxima and/or minima may be accomplished in a variety of ways, for instance by dedicated signal processing circuitry.

In another embodiment there is only a single light source and a single detector which are moved mechanically so that the incident light is detected by the detector over a variety of incidence angles. In another version there is only a single light source and a single detector and the wafer itself it tilted along with the detector.

In the apparatus of FIG. 6 the light sources 56 and the corresponding light sensors 64 are positioned on either side of the normal (the normal is not a physical structure but merely an axis perpendicular to the plane of the principal surface of substrate 50), and light from a particular LED 56 after being reflected from wafer 50 is received by the corresponding sensor 64. By turning on and off the light sources 56 in sequence, the reflected signal intensity as a function of incidence angle can be measured. Thus by such an arrangement, the presence or absence of a resist film is detected without tilting or moving the wafer.

Since the positions of the light sources 56 are fixed with respect to the detectors in this embodiment, this apparatus can be operated without any pre-alignment procedure. The linear stage 40 and an associated rotary stage 44 facilitate monitoring several sites on the wafer for presence or absence of a photoresist layer. The stage motion, light source operation and data acquisition are controlled by conventional computer programs via a computer 82 in one embodiment.

For such a device the sensing of the presence (or absence) of a thin film can be performed in, e.g. one second or less per semiconductor wafer, not counting the time required to place the wafer into the apparatus and extract it therefrom.

In another embodiment, the apparatus of FIG. 6 is incorporated within a photolithography machine or in any other sort of apparatus used in semiconductor processing, and so the presence of the photoresist film is detected immediately before or after other lithography processing steps.

This disclosure is illustrative and not limiting; further modifications will be apparent to one skilled in the art, in the light of this disclosure, and are intended to fall within the scope of the appended claims.

We claim:

1. A method of detecting presence of a film formed on a substrate, comprising the steps of:

providing illumination incident on the substrate;

detecting resulting light reflected from the substrate; and determining if there is a local minimum or maximum in an intensity of the reflected light as an angle of incidence of the illumination is varied, thereby to determine presence of a film on the substrate.

2. The method of claim 1, wherein the illumination is visible or infrared light.

3. The method of claim 1, wherein the illumination is from a light emitting diode.

4. The method of claim 1, wherein the film is silicon dioxide and the substrate is silicon.

5. The method of claim 1, wherein the film is photoresist.

6. The method of claim 1, wherein the step of detecting comprises moving a source of the illumination.

7. The method of claim 1, wherein the step of detecting comprises moving a detector for the reflected light.

8. The method of claim 1, wherein the step of detecting includes:

providing a plurality of sources of the illumination and a plurality of detectors, the sources and detectors each being arranged at a different angle with respect to a normal to a plane defined by the film.

9. An apparatus for detecting a presence of a film formed on a substrate, comprising:

a support for holding the substrate;

a plurality of light sources arranged spaced apart from the support, each source being at a different angle with respect to a normal to a plane of a surface of the substrate;

a plurality of light detectors arranged spaced apart from the support, each detector being at a different angle with respect to the normal; and a processor coupled to the light detectors to find a local minimum or maximum in an intensity of light reflected from the substrate by illuminating the surface of the substrate using the plurality of light sources one at a time, thereby to determine presence of a film on the substrate.

10. The apparatus of claim 9, wherein the support is a rotary stage.

11. The apparatus of claim 9, wherein the light sources are light emitting diodes.

12. The apparatus of claim 9, wherein the light sources emit visible or infrared light.

13. The apparatus of claim 9, wherein the detectors are charge coupled devices.

14. An apparatus for detecting a presence of a film formed on a substrate, comprising:

a support for holding the substrate;

at least one light source arranged spaced apart from the support to illuminate a substrate on the support;

at least one light detector arranged spaced apart from the support, the light detector being movable with respect to a normal to a plane defined by a principal surface of the substrate; and a processor coupled to the light detector to find a minimum or maximum in an intensity of light reflected from the substrate at a plurality of angles as determined by movement of the light detector.

15. The method of claim 1, wherein presence of the film is determined if, as the angle of incidence is varied, the intensity of the reflected light varies sinusoidally.

16. The method of claim 1, wherein the step of detecting comprises tilting the substrate relative to a source of the illumination.

* * * * *